United States Patent
Narducci

(10) Patent No.: US 9,057,135 B2
(45) Date of Patent: Jun. 16, 2015

(54) METHOD FOR PROTECTING SILVER AND SILVER ALLOY SURFACES AGAINST TARNISHING

(75) Inventor: Dario Narducci, Milan (IT)

(73) Assignee: AGERE S.R.L., Como (IT)

(*) Notice: Subject to any disclaimer, the term of this patent is extended or adjusted under 35 U.S.C. 154(b) by 0 days.

(21) Appl. No.: 13/578,241

(22) PCT Filed: Feb. 23, 2011

(86) PCT No.: PCT/IB2011/000369
§ 371 (c)(1),
(2), (4) Date: Aug. 22, 2012

(87) PCT Pub. No.: WO2011/104614
PCT Pub. Date: Sep. 1, 2011

(65) Prior Publication Data
US 2012/0305141 A1    Dec. 6, 2012

(30) Foreign Application Priority Data
Feb. 24, 2010   (IT) ............... VE2010A0008

(51) Int. Cl.
*C23C 22/48*     (2006.01)
*C23C 22/83*     (2006.01)
*C23F 11/16*     (2006.01)
*B05D 1/18*      (2006.01)
(Continued)

(52) U.S. Cl.
CPC ............. *C23F 11/161* (2013.01); *B05D 1/185* (2013.01); *B05D 3/0486* (2013.01); *B05D 2202/40* (2013.01); *B05D 2350/63* (2013.01); *B82Y 30/00* (2013.01); *B82Y 40/00* (2013.01); *C23C 22/02* (2013.01)

(58) Field of Classification Search
CPC .......... C23C 22/48; C23C 22/58; C23C 22/83
See application file for complete search history.

(56) References Cited

U.S. PATENT DOCUMENTS 6,165,284 A * 12/2000 Shubkin .................... 134/38

FOREIGN PATENT DOCUMENTS

| DE | 3905850 | 8/1990 |
| EP | 0492487 | 7/1992 |

(Continued)

OTHER PUBLICATIONS

Burleigh T D et al: "Tarnish Protection of Silver Using a Hexadecanethiol Self-Assembled Monolayer and Descriptions of Accelerated Tarnish Tests", Corrosion, Mace International, US, vol. 57, No. 12, Dec. 1, 2001, pp. 1066-1074, ISSN: 0010-9312; the whole document.

(Continued)

*Primary Examiner* — Lois Zheng
(74) *Attorney, Agent, or Firm* — Themis Law

(57) ABSTRACT

A method for protecting silver and silver alloy surfaces against tarnishing, characterized by initially subjecting the surface to be treated to cleaning pre-treatment in organic solvents; immersing the cleaned surface in an acid solution able to ensure formation of a thin layer of silver oxide; immersing the oxidized surface in a solution of at least one thiol of formula $CH_3(CH_2)_n SH$ where n is between 10 and 16; and chemically reacting the molecules of said thiol with the previously oxidized silver surface, in an environment containing water vapor at a temperature of at least 50° C.

9 Claims, 2 Drawing Sheets

(51) Int. Cl.
*B82Y 30/00* (2011.01)
*B82Y 40/00* (2011.01)
*C23C 22/02* (2006.01)
*C23C 22/58* (2006.01)
*B05D 3/04* (2006.01)

(56) References Cited

FOREIGN PATENT DOCUMENTS

| WO | 9948682 | 9/1999 |
| WO | 2004087996 | 10/2004 |
| WO | 2008047375 | 4/2008 |
| WO | 2009067446 | 5/2009 |

OTHER PUBLICATIONS

J.C. Love, L.A. Estroff, J.K. Kriebel, R.G. Nuzzo, G.M. Whitesides:"Self-assembled monolayers of thiolates on metals as a form of nanotechnology", Chemical Review, vol. 105, 2005, pp. 1103-1169, p. 1111, paragraph 2.2.1—p. 1113, paragraph 2.2.1 p. 1114, paragraph 3.1—p. 1115, paragraph 3.1 p. 1116, paragraph 3.1.4—p. 1117, paragraph 3.1.4.

* cited by examiner

METHOD FOR PROTECTING SILVER AND SILVER ALLOY SURFACES AGAINST TARNISHING

FIELD OF THE INVENTION

The present invention relates to a method for protecting silver and silver alloy surfaces against tarnishing.

BACKGROUND OF THE INVENTION

Spontaneous tarnishing of silver and silver alloy surfaces exposed to the atmosphere is known to constitute a serious problem for silverware producers. In this respect it has been shown by various market investigations that one of the main reasons for the reduction in the market for silverware articles is linked to the tarnishing of their surfaces as a result of the formation of sulphurated silver compounds.

The tarnishing of silver articles, where the term "silver articles" means both solid silver articles and articles made of base metals or alloys coated with silver layers of micrometric thickness, is a process involving only the metal surface, without resulting in deep corrosion of the metal itself. It involves progressive alteration of its reflectance spectrum, giving rise to a variation in the surface colour. Although the process does not produce irreversible damage, silver tarnishing requires methodical surface cleaning which, although irksome for the final user, is even more so for distributors and retail sellers.

For this reason, the protection of silver surfaces against tarnishing has been the subject of much research over the years. In particular it has already been proposed to prevent or significantly reduce tarnishing by protecting for example the silver surface by thin polymer layers or by using waxes or surfactants which are deposited on the article surface on termination of its production. These known methods are based on the principle of preventing or generally hindering the adsorption of oxygen, of sulphurated volatile oxidants such as $SO_3$, or of non-oxidizing sulphurated volatile compounds such as $H_2S$, onto the metal surface.

Methods are also known which, both in the case of solid articles and of articles made of base metal alloys coated with the noble metal, prevent surface tarnishing by replacing the silver with alloys of noble metals which are less electropositive and hence less sensitive to tarnishing processes.

However all these known methods present the substantial drawback of perceptibly modifying the article appearance as they necessarily involve a variation in the material reflectance spectrum.

Methods have also been proposed for depositing spontaneously ordered molecular layers of organic molecules (known as spontaneously assembled [SAM] layers) on metals such as gold, silver and copper. These have opened new facilities for the development of processes able to reconcile the requirement of preventing or delaying surface tarnishing with the need not to appreciably alter colour and brightness.

SAM layers are monolayers or sub-monolayers of ordered organic molecules formed by molecule chemisorption on the surface of solids. In the case of surfaces of metals of group 11 (IB) of the periodic table (Cu, Ag, Au), processes are known [J. C. Love, L. A. Estroff, J. K. Kriebel, R. G. Nuzzo and G. M. Whitesides, "Self-assembled monolayers of thiolates on metals as a form of nanotechnology" Chemical Review, 105 (2005) 1103-1169] for forming said SAM layers starting from thiols in solution via the formation of direct metal-sulphur bonds starting from a suitable solution. The spontaneous formation of self-assembled layers is of interest according to the present invention, given that these layers are able to cover surfaces of arbitrary shape and size and can be obtained without recourse to ultra-high vacuum techniques, with consequent production cost reduction.

Moreover it is known that SAM layers with coating grades close to unity constitute an effective diffusive barrier to sulphurated volatile oxidant gases such as $SO_3$ and/or non-oxidizing sulphurated volatile compounds such as $H_2S$, towards the silver surface—and hence their relative adsorption on the same surface. In particular, it has been proposed (PCT/US1999/006775) to deposit thiols of general formula $CH_3(CH_2)_nSH$ on silver surfaces using procedures consisting of immersing said surfaces in suitable aqueous or organic thiol solutions. In particular, it has been noted that this procedure is effective in retarding silver oxysulphide growth and hence in partially preventing tarnishing of silver articles.

However this known process is not ideal in preventing tarnishing of articles subject to ordinary handling or even only to moderate functional use, if their surface is exposed to minimal abrasion (for example dust removal by soft cloths) or if their surfaces are brought into contact with hot liquids. The degraded protection capacity of the surface of these articles is probably due to two factors:

the assembly procedure described in WO1999048682 assumes that the formation of the prescribed covalent bonds between the surface silver atoms and the thiol sulphur atoms occurs spontaneously according to the reaction

on the non-oxidized surface (where R is a generic alkyl); i.e.

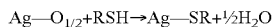

on the oxidized surface; i.e.

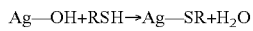

on the hydroxylated surface. However these reactions do not come to completion at ambient temperature, and consequently parts of the surface may not be coated, that is coated in a faint way from physisorbed thiols, making triggering of local oxidation processes (pitting) possible; moreover a fraction of the thiols present on the surface could be physisorbed and not chemisorbed, and hence be easily removed from the surface by mechanical or chemical means even under mild treatment conditions;

on surfaces of articles made of solid silver or of base metal or metal alloys coated with silver layers, the presence of micrometric width scoring means that the metal surface is not entirely wetted by the thiol solution and hence does not react completely with the thiols. This makes triggering of oxidative processes possible in the unprotected surface regions, and can consequently explain the appearance of surface tarnishing (typically not uniform).

SUMMARY OF THE INVENTION

The problem is solved according to the invention by a method for protecting silver and silver alloy surfaces from tarnishing, comprising:

initially subjecting the surface to be treated to cleaning pre-treatment in organic solvents, immersing the cleaned surface in an acid solution able to ensure formation of a thin layer of silver oxide, immersing the oxidized surface in a solution of at least one thiol of formula

where n is between 10 and 16, and chemically reacting the molecules of said thiol with the previously oxidized silver surface, in an environment containing water vapor at a temperature of at least 50° C. for at least ten minutes.

BRIEF DESCRIPTION OF THE DRAWINGS

A preferred embodiment of the present invention is further clarified hereinafter by way of non-limiting example with reference to the accompanying drawings, in which.

DETAILED DESCRIPTION OF A PREFERRED EMBODIMENT OF THE INVENTION

Figure 1:
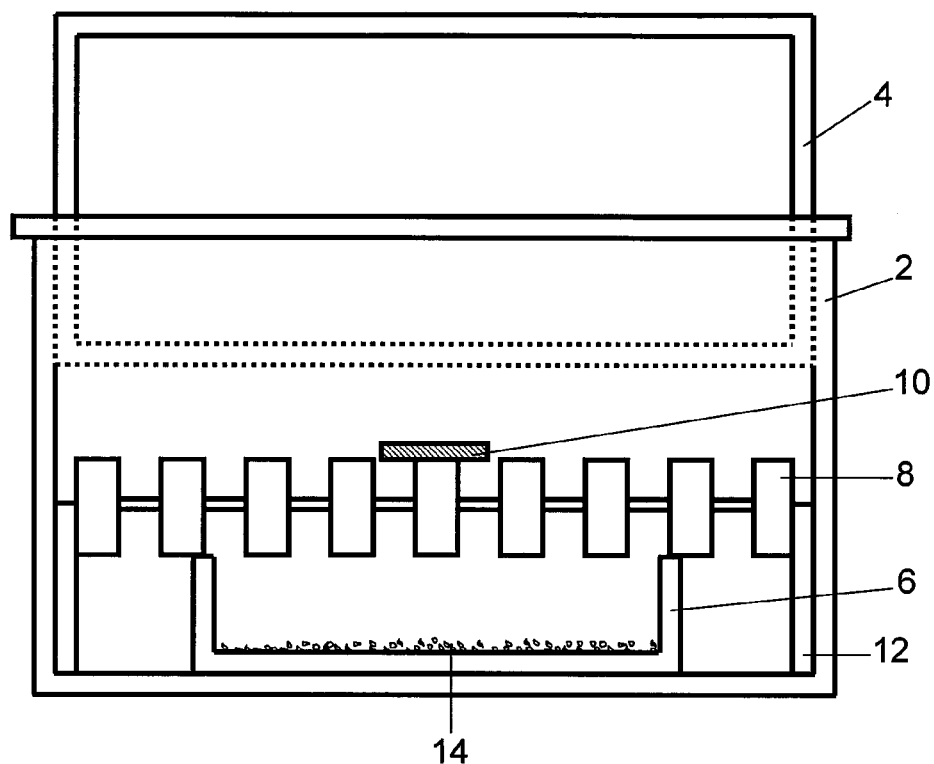
FIG. 1 shows schematically an apparatus used for accelerated tarnishing tests in accordance with UNI EN ISO 4538.

As stated, the method of the invention consists of firstly subjecting the silver coated surface to complete evaluation, removing any coating of hydrophobic substances and any machining residues present on the metal surface.

The surface is degreased by an initial preliminary surface wash with running water and surfactant.

After this preliminary step the article with its surface treated in this manner is immersed in different organic solvents and then heated and subjected to ultrasonic agitation.

At the end of this preliminary phase, the article presenting a surface that has been degreased in organic solvents is immersed in an acid solution able to ensure the formation of a thin layer of silver oxide.

The following represents an example of the implementation of this pre-treatment:

10 min in trichloroethylene at 70° C. (or in cyclohexane at 65°), a further 10 min in trichloroethylene (or in cyclohexane) under ultrasonic agitation at 60° C., 10 min in acetone at 60° C., a further 10 min in acetone under ultrasonic agitation at 60° C., 10 min in ethanol at 70° C., a further 10 min in ethanol under ultrasonic agitation at 60° C.

On termination of the degreasing sequence in organic solvents the article is immersed at ambient temperature in a 10 vol % sulphuric acid ($H_2SO_4$) solution for 150 seconds and rinsed with bidistilled water. The purpose of this treatment is to activate the silver surface, giving rise to a thin oxide layer, possibly hydrated, which facilitates the subsequent thiol bonding process.

The article is then rinsed in bidistilled water and dried in a stream of dry nitrogen.

On termination of the surface preparation sequence, the article is immediately transferred into a solution of a thiol of formula $CH_3(CH_2)_nSH$ where n is between 10 and 16. Preferably a 0.15 M solution of pentadecanethiol ($CH_3(CH_2)_{14}SH$) or hexadecanethiol ($CH_3(CH_2)_{15}SH$) or undecanethiol ($CH_3(CH_2)_{10}SH$) in isopropanol is used at a temperature of about 30° C. The article is then left to react for at least 2 hours under magnetic agitation. After this, the sample is initially rinsed in isopropanol under ultrasonic agitation at ambient temperature for 10 minutes followed by a second rinse in fresh isopropanol again under ultrasonic agitation at ambient temperature for 10 minutes. Both the isopropanol used to prepare the thiol solution and that used in the wash processes are previously degassed by passing dry nitrogen through for one hour. The double rinse in isopropanol removes from the surface those molecules not directly physisorbed on the metal surface. The article is then dried in a nitrogen stream and placed in an oven in air at a temperature of 50° C. for at least 10 minutes. This passage is fundamental in enabling the reaction of eliminating a water molecule by reaction between the thiol and the oxidized silver surface to go to conclusion, consequently ensuring virtually complete protection of the article surface against tarnishing.

To verify the effective surface protection following the use of the method according to the invention, a test chamber was fitted out to evaluate atmospheric tarnishing under accelerated conditions in accordance with the teachings of Italian Standard UNI EN ISO4538 ("thioacetamide corrosion test", March 1998).

The chamber scheme is shown in FIG. 1. It comprises a test environment consisting essentially of a glass container 2 with lid 4, which must be able to resist corrosion by volatile sulphides without emitting any gas or vapor which can influence the test; a disc 6 of non-metallic inert material, inserted into the test chamber, which acts a container for the thioacetamide $(CH_3)(CS(NH_2))$; and a support of non-metallic inert material positioned in the test environment above the disc 6, to support the test pieces 10.

While conducting the test, the test environment is covered by absorbent paper 12 well pressed against the vertical walls and soaked in a solution of sodium acetate trihydrate $Na(CH_3COO).3H_2O$ (30 g of sodium acetate trihydrate dissolved in 10 ml of bidistilled water).

A thin uniform layer of thioacetamide powder 14 is sprinkled on the disc 6 (in a quantity of about 0.020 g—such as to ensure a degree of covering of the disc equal to or greater than 0.050 $g/dm^2$). The test pieces 10 are then placed on the support 8 in a position such as not to touch either the absorbent paper 12 soaked with sodium acetate or the thioacetamide on the support disc. The chamber is then temperature controlled between 25 and 30° C. Under these conditions, the sodium acetate solution determines at equilibrium a known fixed relative humidity in the chamber of 75%.

The tarnishing test is carried out by comparatively exposing test pieces consisting of a flat plate of base alloy coated with a 7 micron layer of silver, they having been either treated or not treated by the method of the invention. The degree of tarnishing is then evaluated after predetermined time intervals, by comparing the appearance of the test pieces both visually and by specular reflectance measurements in the visible-ultraviolet region.

Figure 2:
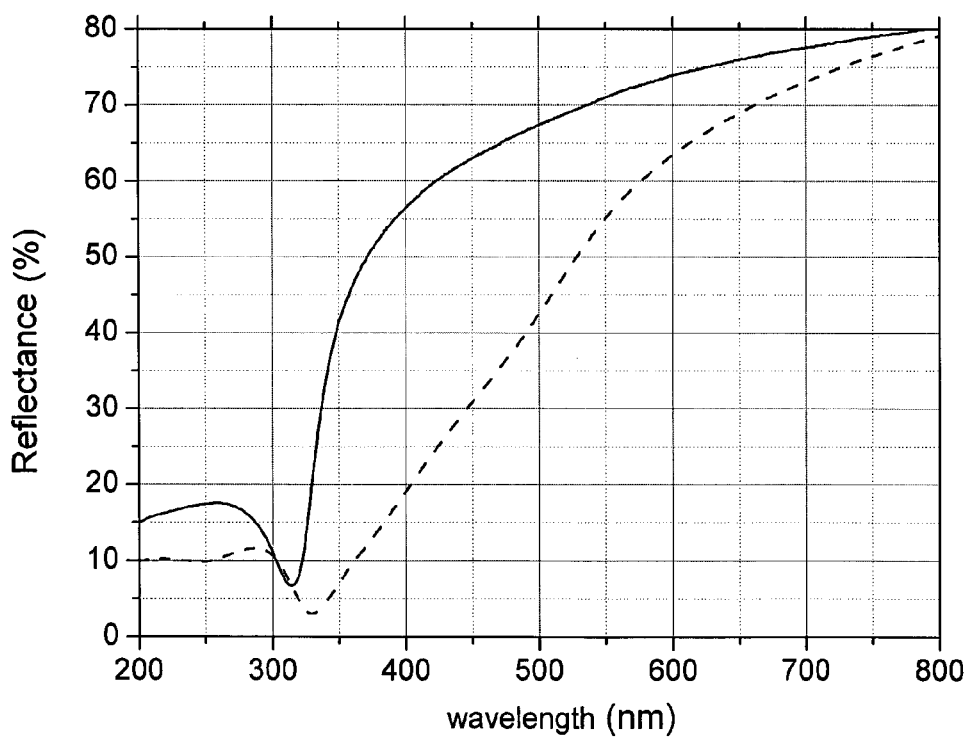
FIG. 2 shows in graphic form the reflection spectrogram of the visible-ultraviolet region for silver and tarnishing silver surfaces.

The spectrograms of a test piece just formed and of a test piece which has undergone a heavy tarnishing process are shown in FIG. 2.

Figure 3:
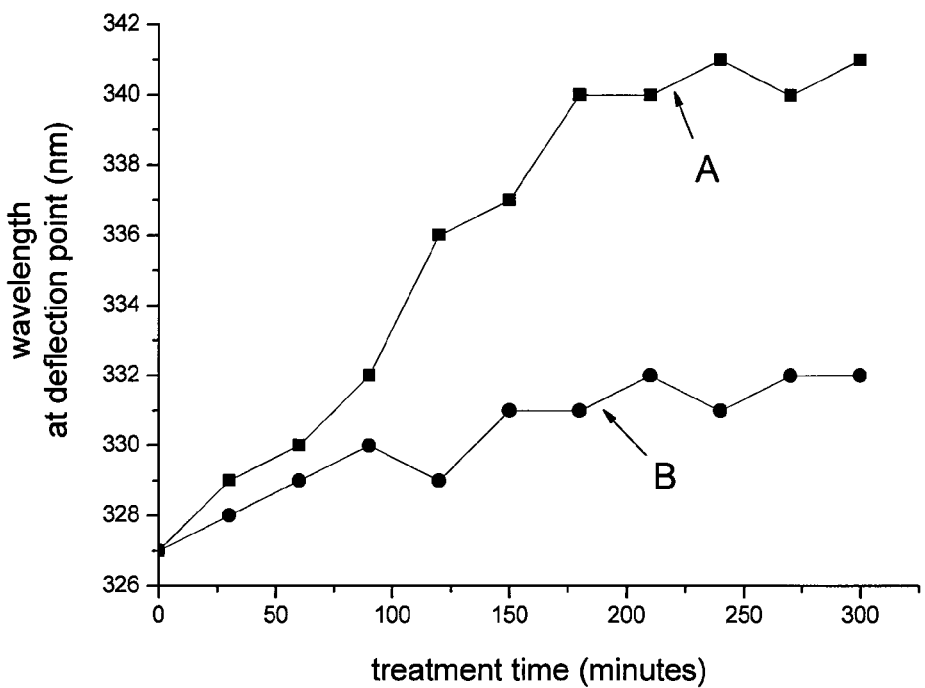
FIG. 3 shows the time variation of the degree of tarnishing determined in accordance with UNI EN ISO 4538 for silver coated surfaces treated in accordance with WO1999048682 and in accordance with the present invention.

In order to verify and further highlight how assembling the thiol molecule on the surface by chemical reaction with the surface previously oxidized in an environment containing water vapor constitutes a critical modification for the purposes of the effectiveness of the surface protection process compared with that claimed in PCT/US1999/006775 and in the scientific literature. FIG. 3 shows the tarnishing curve against time resulting from an accelerated tarnishing test in accordance with ISO 4538 for two silver samples. Of these, the first sample was treated in accordance with the teachings of PCT/US1999/006775 (hence without thermally treating the silver surface on which the thiol molecules were adsorbed), and the second sample was treated by the procedure according to the present invention and comprising thermally treating the silver surface at 50° C. in air for 10 minutes after adsorbing the thiol molecules from solution. Curve A shows the variation in the wavelength at the deflection point against the treatment time of the silver sample treated in accordance with patent application PCT/US1999/006775, while curve B shows the same variation for the silver sample treated in accordance with the present invention. The comparison between the spectrograms in the visible-ultraviolet region in specular reflectance was conducted such as to verify the time displacement of the reflectance curve deflection point, which in metal silver is positioned at 318 nm and is displaced to higher wavelengths following tarnishing. The difference in the protection duration highlights the superior stability of the thiol layers made to react chemically with the surface following thermal treatment compared with those obtained in the absence of thermal treatment.

For the further purpose of determining the acceleration factors of the conducted test, untreated silver samples left exposed to the atmosphere for one year were compared with untreated silver samples subjected to the accelerated tarnishing test in accordance with ISO 4538. For the comparison, the aforesaid method of displacing the inflection point of the reflectance curve was used.

It was hence determined that the ratio between the first order kinetic constants of the spontaneous and accelerated tarnishing processes is equal to about 14000. On the basis of this value it was hence estimated that the treatment according to the invention can prevent visually apparent tarnishing for a time exceeding five years.

The treatment life span was further verified by subjecting samples treated and samples not treated by the method of the invention to handling by the bare hands, to mechanical cleaning by soft cloths, by manual washing with liquid detergent, by dishwasher washing and by contact with hot liquid foods.

Figure 4:
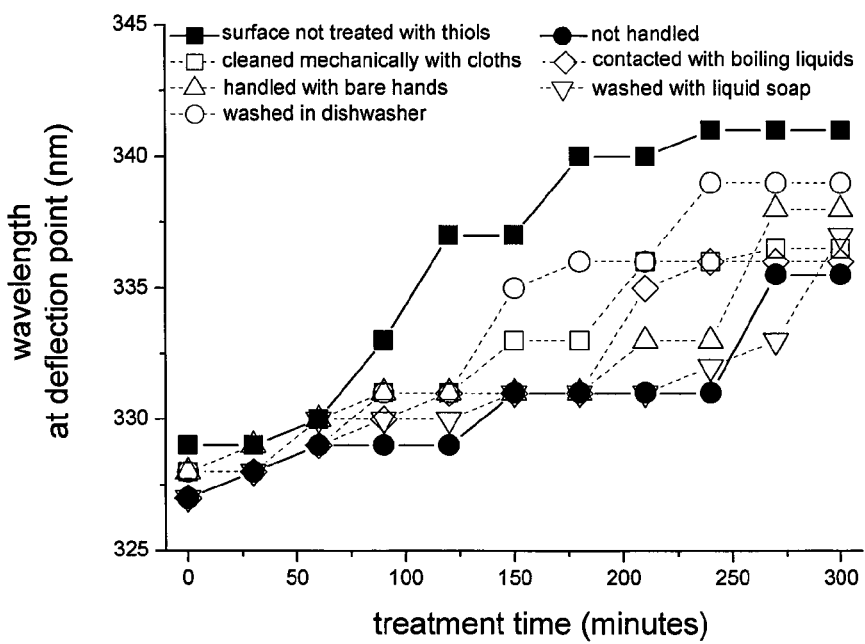
FIG. 4 shows the time variation of the degree of tarnishing determined in accordance with UNI EN ISO 4538 for untreated silver coated surfaces and in accordance with the present invention.

FIG. 4 comparatively shows the pattern of the tarnishing curves for the accelerated tarnishing tests carried out in accordance with ISO 4538. In all the considered cases, the method of the invention was shown to be able to guarantee acceptable protection for times exceeding four years.

It was also verified by direct metallographic optical microscope observation that the method of the invention is also effective on silver coated surfaces characterized by abrasions deriving from imperfect polishing of the base metal alloy support.

The invention claimed is:

1. A method for protecting silver and silver alloy surfaces against tarnishing, comprising:
   initially subjecting a surface to be treated to cleaning pre-treatment in organic solvents;
   immersing the cleaned surface in an acid solution able to ensure formation of a thin layer of silver oxide;
   immersing the oxidized surface in a liquid solution of at least one thiol of formula $CH_3(CH_2)_nSH$ where n is between 10 and 16, to provide a treated surface; and
   thereafter, removing the treated surface from the liquid solution, subsequently drying the treated surface, and subsequently subjecting the dried surface to a separate heating treatment by placing said previously oxidized silver surface in an environment containing air at a temperature of at least 50° C. for at least ten minutes, thereby chemically reacting molecules of said thiol with the previously oxidized silver surface.

2. The method as claimed in claim 1, wherein the step of initially subjecting a surface to be treated to cleaning pre-treatment comprises cleaning the surface to be treated by immersion in at least one organic solvent.

3. The method as claimed in claim 2, further comprising heating the surface immersed in the at least one organic solvent.

4. The method as claimed in claim 3, further comprising subjecting the surface to thermal agitation during the heating.

5. The method as claimed in wherein the step of immersing the cleaned surface in an acid solution comprises immersing the cleaned surface in a sulphuric acid solution.

6. The method as claimed in claim 1, wherein the step of immersing the oxidized surface in a solution comprises immersing the oxidized surface in a pentadecanethiol solution.

7. The method as claimed in claim 1, wherein the step of immersing the oxidized surface in a solution comprises immersing the oxidized surface in a hexadecanethiol solution.

8. The method as claimed in claim 1, wherein the step of immersing the oxidized surface in a solution comprises immersing the oxidized surface in an undecanethiol solution.

9. The method as claimed in claim 1, wherein the step of immersing the oxidized surface in a solution comprises immersing the oxidized surface in a solution of at least one thiol at a temperature of about 30° C. for at least two hours.

* * * * *